US008892339B2

(12) United States Patent
Ma et al.

(10) Patent No.: US 8,892,339 B2
(45) Date of Patent: Nov. 18, 2014

(54) TRANSMISSION LOAD PREDICTING SYSTEM FOR A STOP-START SYSTEM AND A HYBRID ELECTRIC VEHICLE

(75) Inventors: Qi Ma, Farmington Hills, MI (US); Robert Douglas Shafto, New Hudson, MI (US); Ronald F. Lochocki, Jr., Ypsilanti, MI (US)

(73) Assignee: GM Global Technology Operations LLC

( * ) Notice: Subject to any disclaimer, the term of this patent is extended or adjusted under 35 U.S.C. 154(b) by 445 days.

(21) Appl. No.: 12/835,842

(22) Filed: Jul. 14, 2010

(65) Prior Publication Data
US 2011/0295474 A1 Dec. 1, 2011

Related U.S. Application Data

(60) Provisional application No. 61/350,097, filed on Jun. 1, 2010.

(51) Int. Cl.
*F02N 11/08* (2006.01)
*F02D 11/10* (2006.01)
*F02D 29/02* (2006.01)
*F02D 13/02* (2006.01)

(52) U.S. Cl.
CPC ......... *F02D 29/02* (2013.01); *F02N 2200/0802* (2013.01); *F02N 2300/102* (2013.01); *F02N 11/0822* (2013.01); *F02N 2300/104* (2013.01); *Y02T 10/48* (2013.01); *F02D 13/0219* (2013.01); *F02N 11/0818* (2013.01); *F02D 11/105* (2013.01); *F02N 11/084* (2013.01)
USPC ........................................................ 701/113

(58) Field of Classification Search
CPC .............. F02D 41/065; F02N 11/0822; F02N 2300/102; F02N 2200/101; F02N 2200/022; Y02T 10/48
See application file for complete search history.

(56) References Cited

U.S. PATENT DOCUMENTS

| 4,492,195 A | 1/1985 | Takahashi et al. |
| 4,958,516 A | 9/1990 | Stiles et al. |

(Continued)

FOREIGN PATENT DOCUMENTS

| CN | 1407221 | 4/2003 |
| CN | 1912370 A | 2/2007 |

(Continued)

OTHER PUBLICATIONS

Ohata et al., "Benchmark Problem for Automotive Engine Control", SICE Annual Conference, Sep. 2007, pp. 1723-1726.*

(Continued)

*Primary Examiner* — John R Olszewski
*Assistant Examiner* — Todd Melton

(57) ABSTRACT

An engine system of a vehicle includes an engine torque module. The engine torque module determines an engine output torque profile including predicted torque outputs based on an accelerator signal and an engine state variable. A load control module determines a dynamic transmission load profile based on the engine output torque profile and an engine speed profile. The dynamic transmission load profile includes transmission loads as a function of engine speed during an auto-start of an engine. A compensation module generates a torque compensation signal based on the dynamic transmission load profile. An actuator module compensates for a change in a transmission load based on the torque compensation signal and during a transition of the engine from a cranking state to an idle state.

20 Claims, 6 Drawing Sheets

(56) References Cited

U.S. PATENT DOCUMENTS

| | | | |
|---|---|---|---|
| 5,690,073 | A | 11/1997 | Fuwa |
| 5,803,040 | A | 9/1998 | Biesinger et al. |
| 6,155,242 | A | 12/2000 | Kotwicki et al. |
| 6,202,776 | B1 | 3/2001 | Masberg et al. |
| 6,257,207 | B1 | 7/2001 | Inui et al. |
| 6,275,759 | B1 * | 8/2001 | Nakajima et al. ............... 701/54 |
| 6,513,489 | B2 | 2/2003 | Osanai |
| 6,675,088 | B2 | 1/2004 | Miki |
| 6,675,768 | B2 | 1/2004 | Kanai |
| 6,758,190 | B2 * | 7/2004 | Denz et al. .................... 123/350 |
| 6,857,987 | B2 | 2/2005 | Aldrich, III et al. |
| 6,931,318 | B2 * | 8/2005 | Kaita et al. ................... 701/113 |
| 7,079,935 | B2 | 7/2006 | Lewis et al. |
| 7,079,941 | B2 | 7/2006 | Tetsuno et al. |
| 7,082,930 | B2 | 8/2006 | Liller et al. |
| 7,130,731 | B2 * | 10/2006 | Itoh et al. ......................... 701/54 |
| 7,146,960 | B2 | 12/2006 | Phlips et al. |
| 7,177,755 | B2 | 2/2007 | Nishikawa et al. |
| 7,204,226 | B2 | 4/2007 | Zillmer et al. |
| 7,559,304 | B2 | 7/2009 | Kataoka et al. |
| 7,587,270 | B2 | 9/2009 | Tabata et al. |
| 7,931,002 | B1 | 4/2011 | Gibson et al. |
| 8,099,203 | B2 | 1/2012 | Miller et al. |
| 8,140,247 | B2 | 3/2012 | Gibson et al. |
| 8,141,533 | B2 | 3/2012 | Demura |
| 8,157,035 | B2 | 4/2012 | Whitney et al. |
| 8,214,112 | B2 * | 7/2012 | Rew et al. ........................ 701/51 |
| 8,408,176 | B2 | 4/2013 | Pursifull et al. |
| 8,442,747 | B2 | 5/2013 | Ma et al. |
| 2004/0084002 | A1 | 5/2004 | Mitsutani et al. |
| 2004/0153236 | A1 | 8/2004 | Itoh et al. |
| 2006/0048734 | A1 | 3/2006 | Kataoka et al. |
| 2006/0218923 | A1 | 10/2006 | Sopko et al. |
| 2007/0163531 | A1 | 7/2007 | Lewis et al. |
| 2007/0261668 | A1 | 11/2007 | Kataoka et al. |
| 2008/0275624 | A1 | 11/2008 | Snyder |
| 2009/0066337 | A1 | 3/2009 | Gibson et al. |
| 2009/0299586 | A1 * | 12/2009 | Miller et al. ..................... 701/54 |
| 2010/0038158 | A1 * | 2/2010 | Whitney et al. .......... 180/65.265 |
| 2010/0114462 | A1 | 5/2010 | Gibson et al. |
| 2010/0174473 | A1 | 7/2010 | Pursifull et al. |
| 2010/0211299 | A1 | 8/2010 | Lewis et al. |
| 2012/0245831 | A1 | 9/2012 | Patterson et al. |
| 2013/0066540 | A1 | 3/2013 | Lewis et al. |

FOREIGN PATENT DOCUMENTS

| | | |
|---|---|---|
| CN | 101598214 | 12/2009 |
| CN | 101680414 | 3/2010 |
| JP | 02081939 A | 3/1990 |

OTHER PUBLICATIONS

Rokusho et al., "Combined Feedforward and Feedback Control for Start-Up Engine Control", 27th Chinese Control Conference, Jul. 2008, pp. 562-565.*

Zhang et al., "Model-Based Cold-Start Speed Control Design for SI Engines", Proceedings of the 17th World Congress of the International Federation of Automatic Control, Jul. 2008, pp. 1042-1047.*

Saerens et al., "Minimization of the Fuel Consumption of a Gasoline Engine Using Dynamic Optimization", Applied Energy, vol. 86 Iss. 9, Sep. 2009, pp. 1582-1588.*

Rajamani, "Vehicle Dynamics and Control", 2006, pp. 111-117.*

U.S. Appl. No. 12/835,830, Qi Ma et al., filed Jul. 14, 2010.
U.S. Appl. No. 12/835,835, Qi Ma et al., filed Jul. 14, 2010.
U.S. Appl. No. 12/835,848, Qi Ma et al., filed Jul. 14, 2010.
U.S. Appl. No. 12/835,856, Qi Ma et al., filed Jul. 14, 2010.
U.S. Appl. No. 12/835,942, Qi Ma et al., filed Jul. 14, 2010.
U.S. Appl. No. 12/835,951, Qi Ma et al., filed Jul. 14, 2010.

* cited by examiner

TRANSMISSION LOAD PREDICTING SYSTEM FOR A STOP-START SYSTEM AND A HYBRID ELECTRIC VEHICLE

CROSS-REFERENCE TO RELATED APPLICATIONS

This application claims the benefit of U.S. Provisional Application No. 61/350,097, filed on Jun. 1, 2010. The disclosure of the above application is incorporated herein by reference in its entirety.

This application is related to U.S. patent application Ser. No. 12/835,830 filed on Jul. 14, 2010, Ser. No. 12/835,835 filed on Jul. 14, 2010, Ser. No. 12/835,848 filed on Jul. 14, 2010, Ser. No. 12/835,856 filed on Jul. 14, 2010, Ser. No. 12/835,942 filed on Jul. 14, 2010, and 12/835,951 filed on Jul. 14, 2010. The disclosures of the above applications are incorporated herein by reference in their entirety.

FIELD

The present disclosure relates to hybrid electric vehicles and stop-start engine control systems.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A stop-start vehicle and a hybrid electric vehicle (HEV) may each include an internal combustion engine (ICE), a transmission and one or more electric motors and a control module. The stop-start vehicle and the HEV may shut down (deactivate) an ICE, for example, to reduce the amount of time the ICE is idling. This improves fuel economy and reduces emissions. The ICE may be shut down when vehicle speed is less than a threshold.

In a stop-start system and in a HEV system an ICE may be shut down and/or transitioned to an at rest state (i.e. engine speed is equal to 0 revolutions/second). The ICE may be automatically started, for example, when an accelerator pedal is actuated.

A transmission of a stop-start vehicle system and of a HEV system may include a torque converter that is connected to an ICE. A clutch of the torque converter and, for example, a first gear of the transmission may be engaged prior to startup of the ICE. With the clutch and first gear engaged the vehicle can begin to move forward, as long as the ICE produces torque. Although this can improve response time of vehicle launch of a stop-start vehicle system and a HEV, powertrain vibrations during startup can result due to an increase in speed of the ICE and load of the transmission on the ICE.

SUMMARY

An engine system of a vehicle is provided and includes an engine torque module. The engine torque module determines an engine output torque profile including predicted torque outputs based on an accelerator signal and an engine state variable. A load control module determines a dynamic transmission load profile based on the engine output torque profile and an engine speed profile. The dynamic transmission load profile includes transmission loads as a function of engine speed during an auto-start of an engine. A compensation module generates a torque compensation signal based on the dynamic transmission load profile. An actuator module compensates for a change in a transmission load based on the torque compensation signal and during a transition of the engine from a crank state to an idle state.

In other features, a method of operating an engine system is provided and includes determining an engine output torque profile including a current torque output and subsequent torque outputs based on an accelerator signal and an engine state variable. A dynamic transmission load profile is determined based on the engine output torque profile and an engine speed profile. The dynamic transmission load profile includes transmission loads as a function of engine speed during an auto-start of an engine. A torque compensation signal is generated based on the dynamic transmission load profile. A change in a transmission load is compensated for based on the torque compensation signal and during a transition of the engine from a crank state to an idle state.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
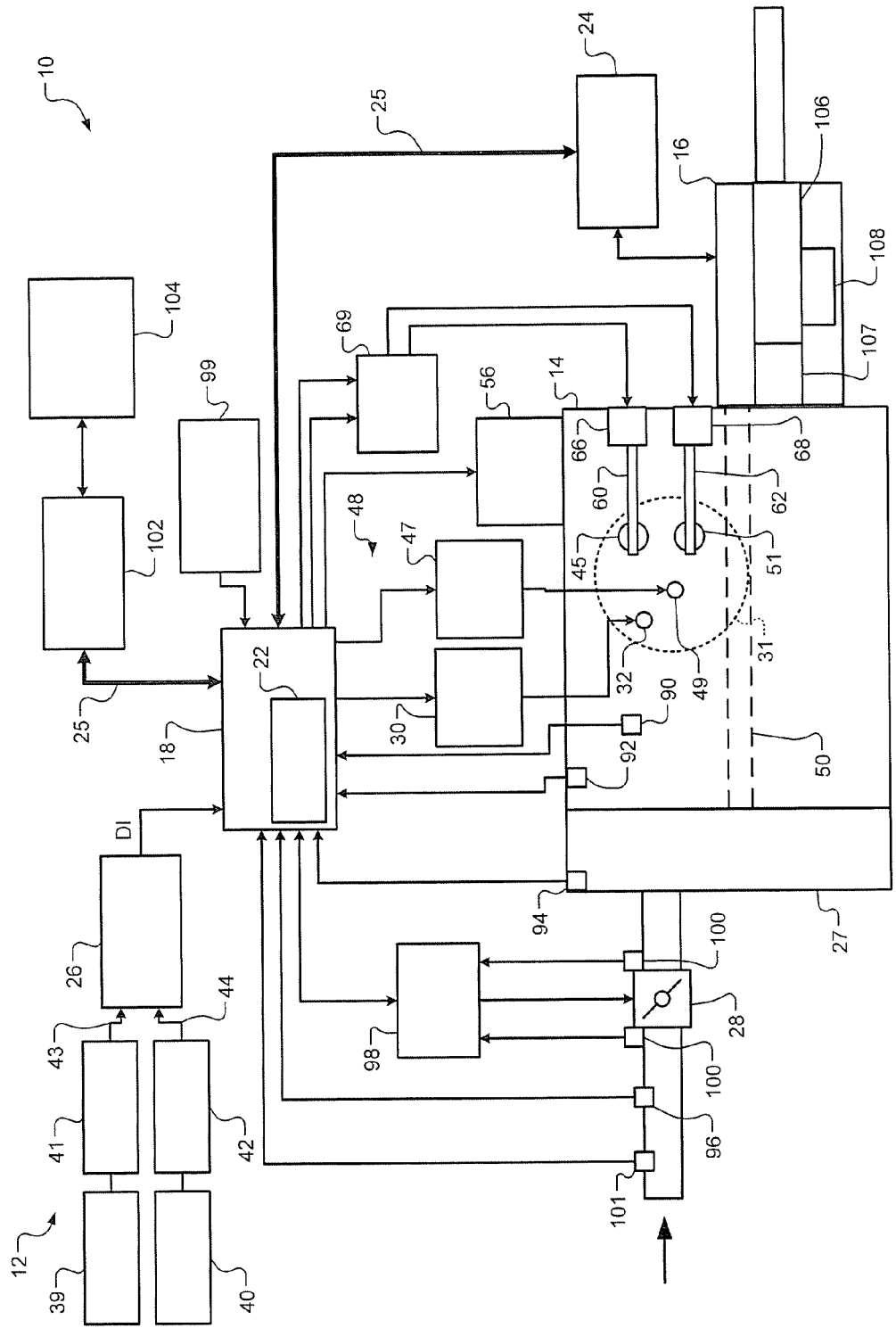
FIG. 1 is a functional block diagram of an engine system in accordance with the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

In FIG. 1, an exemplary engine system 10 and corresponding stop-start control system 12 are shown. The engine system 10 includes an internal combustion engine (ICE) 14 and a transmission system 16. The ICE 14 has a corresponding engine control module (ECM) 18. The stop-start control system 12 includes the ECM 18, which has a blending module 22. The ECM 18 auto-stops and auto-starts the ICE 14 when certain conditions are satisfied to conserve fuel and provide the torque to drive a vehicle. Example conditions are described below.

The engine system 10 and the stop-start control system 12 operate in auto-start and auto-stop modes. During the auto-stop mode, speed of the ICE 14 is decreased and fuel and spark of the ICE 14 are deactivated. During the auto-stop mode, the ICE 14 will coast down until it is stopped (stalled state). The ICE 14 is deactivated and speed of the ICE 14 is decreased to 0 revolutions/second (rev/s). The speed of the ICE 14 is equal to 0 rev/s when, for example, the crankshaft of the ICE 14 is not rotating. The ICE 14 may be considered shut down when fuel (or fuel system) and spark (or ignition system) are deactivated. During the auto-start mode, the ICE 14 may be cranked (crank state) and speed of the ICE 14 may be increased to an idle speed (idle state). Fuel and spark are activated during the auto-start mode.

The blending module 22 generates compensated engine speed and torque output signals to compensate transmission load experienced by the ICE 14 during the auto-start mode. The compensated engine speed and torque output signals compensate for dynamic transmission loads experienced during a startup of the engine. Dynamic transmission loads occur because of rapid changes in engine speed during a startup and auto-start of the ICE 14.

Engine speed is increased at usually a high acceleration rate when transitioning from a cranking speed to an idle speed. Rates of change in engine speed are typically less after an engine is at an idle speed, as opposed to when the engine is cranked and transitions from a cranking state to an idle state. The transmission loads exerted on an engine during an auto-start may be referred to as dynamic loads. The transmission loads experienced during periods with minimal engine acceleration are referred to static loads. As disclosed herein, the dynamic transmission loads applied on the ICE 14 are compensated based on a dynamic load profile and a static load profile. This is described further with respect to FIGS. 2-6.

The ECM 18 may adjust fuel and spark parameters for each of the cylinders to respond to compensated engine speed and torque output signals generated by the blending module 22. The fuel parameters may include, for example, fuel injection quantity, fuel injection pressure, fuel injection timing, etc. The spark parameters may include, for example, spark energy and spark timing.

While a spark ignition type engine is described herein, the present disclosure is applicable to other types of torque producers, such as gasoline type engines, gaseous fuel type engines, diesel type engines, propane type engines, and hybrid type engines. The transmission system 16 has a corresponding transmission control module (TCM) 24. The ECM 18 and the TCM 24 may communicate with each other via serial and/or parallel connections and/or via a control area network (CAN) 25.

The ICE 14 combusts an air/fuel mixture to produce drive torque for a vehicle based on information from a driver input module 26 (e.g., driver input signal DI) and other information described below. In operation, air is drawn into an intake manifold 27 of the ICE 14 through a throttle valve 28. The ECM 18 commands a throttle actuator module 29 to regulate opening of the throttle valve 28 to control the amount of air drawn into the intake manifold 27 based on, for example, information from the driver input module 26. The ECM 18 commands a fuel actuator module 30 to control the amount of fuel injected into the intake manifold 27, intake runner, and/or a cylinder 31, via for example a fuel injector 32.

The driver input module 26 may be or receive signals from, for example, sensors of a brake actuator 39 (e.g., brake pedal) and/or an accelerator 40 (e.g., accelerator pedal). The sensors may include a brake sensor 41 and an accelerator sensor 42. The driver input signal DI may include a brake pedal signal BRAKE 43 and an accelerator pedal signal ACCEL 44. Air from the intake manifold 27 is drawn into cylinders of the ICE 14 through an intake valve 45. While the ICE 14 may include multiple cylinders, for illustration purposes, the cylinder 31 is shown.

The ECM 18 controls the amount of fuel injected into the intake manifold 27 and/or the cylinder 31. The injected fuel mixes with the air and creates the air/fuel mixture in the cylinder 31. A piston (not shown) within the cylinder 31 compresses the air/fuel mixture. Based upon a signal from the ECM 18, a spark actuator module 47 of an ignition system 48 energizes a spark plug 49 in the cylinder 31, which ignites the air/fuel mixture.

The combustion of the air/fuel mixture drives the piston down, thereby driving a rotating crankshaft 50. The piston then begins moving up again and expels the byproducts of combustion through an exhaust valve 51. The byproducts of combustion are exhausted from the vehicle via an exhaust system. The ICE 14 may be a 4-stroke engine where the piston is cycled iteratively through intake, compression, power/expansion and compression strokes.

The intake and exhaust valves 45, 51 may be controlled by a cylinder actuator module 56 via respective camshafts 60, 62 and cam phasers 66, 68. The cam phasers 66, 68 are controlled via a phaser actuator module 69.

The engine system 10 may measure the speed of the crankshaft 50 (engine speed) in revolutions per minute (RPM) using one or more engine position and/or speed sensor(s) 90. The engine position and/or speed sensors 90 may be uni-directional or bi-directional sensors. Uni-directional sensors detect rotation in a single direction. Bi-directional sensors detect rotation in two directions. Bi-directional sensors may be used to detect, for example, "rock back" of the ICE 14. Rock back refers to when the crankshaft of the engine rotates in a reverse direction due to, for example, a balance between piston and friction forces of the engine and/or due to cylinder pressures. Temperature of the ICE 14 may be measured using an engine coolant or oil temperature (ECT) sensor 92. The ECT sensor 92 may be located within the ICE 14 or at other locations where the coolant and/or oil is circulated, such as a radiator (not shown).

The pressure within the intake manifold 27 may be measured using a manifold absolute pressure (MAP) sensor 94. In various implementations, engine vacuum may be measured, where engine vacuum is the difference between ambient air pressure and the pressure within the intake manifold 27. The mass of air flowing into the intake manifold 27 may be measured using a mass air flow (MAF) sensor 96. The ECM 18 determines cylinder fresh air charge primarily from the MAF sensor 96 and calculates a desired fuel mass using open loop, closed loop and transient fueling algorithms. Fuel injector characterization functions convert the desired fuel mass into an injector on time, which is executed by fuel injector outputs of the ECM 18.

A throttle actuator module 98 may monitor position of a throttle valve 28 using one or more throttle position sensors (TPS) 100. Vehicle speed may be determined via a vehicle speed sensor 99. The ambient temperature of air being drawn into the engine system 10 may be measured using an intake air temperature (IAT) sensor 101.

The ECM 18 may communicate with the TCM 24 to coordinate shifting gears in the transmission system 16. For example, the ECM 18 may reduce torque during a gear shift.

The ECM 18 may communicate with a hybrid control module 102 to coordinate operation of the ICE 14 and an electric motor and/or generator (motor/generator) 104. The motor/generator 104 may be used to: assist the ICE 14; replace the ICE 14, and start the ICE 14. The stop-start control system 12 may be a 12 volt (V) stop-start system.

A 12V stop-start system may refer to a traditional powertrain system with a different starter/motor that operates on 12 volts. A 12V stop-start system includes a transmission 106 with a torque converter 107 and an auxiliary pump 108. The auxiliary pump 108 is external to the transmission 106 and maintains fluid pressure within the transmission 106 to maintain engagement of gear(s) and/or clutch(es). For example, a first gear may be held in an engaged state during a neutral idle mode using the auxiliary pump 108. In various implementations, the ECM 18, the TCM 24 and the hybrid control module 102 may be integrated into one or more modules.

Figure 2:
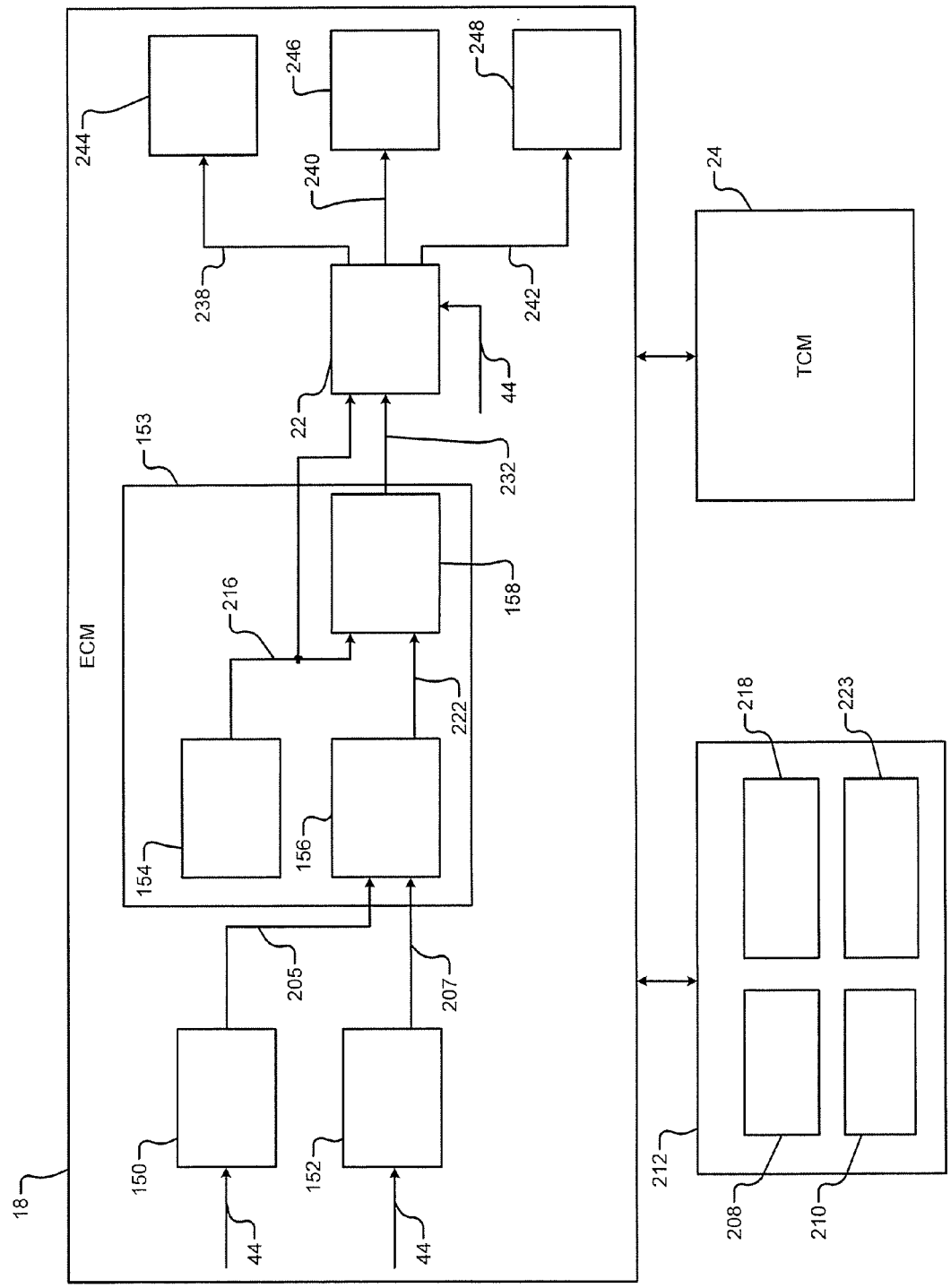
FIG. 2 is a functional block diagram of an engine control module in accordance with the present disclosure.
Figure 3:
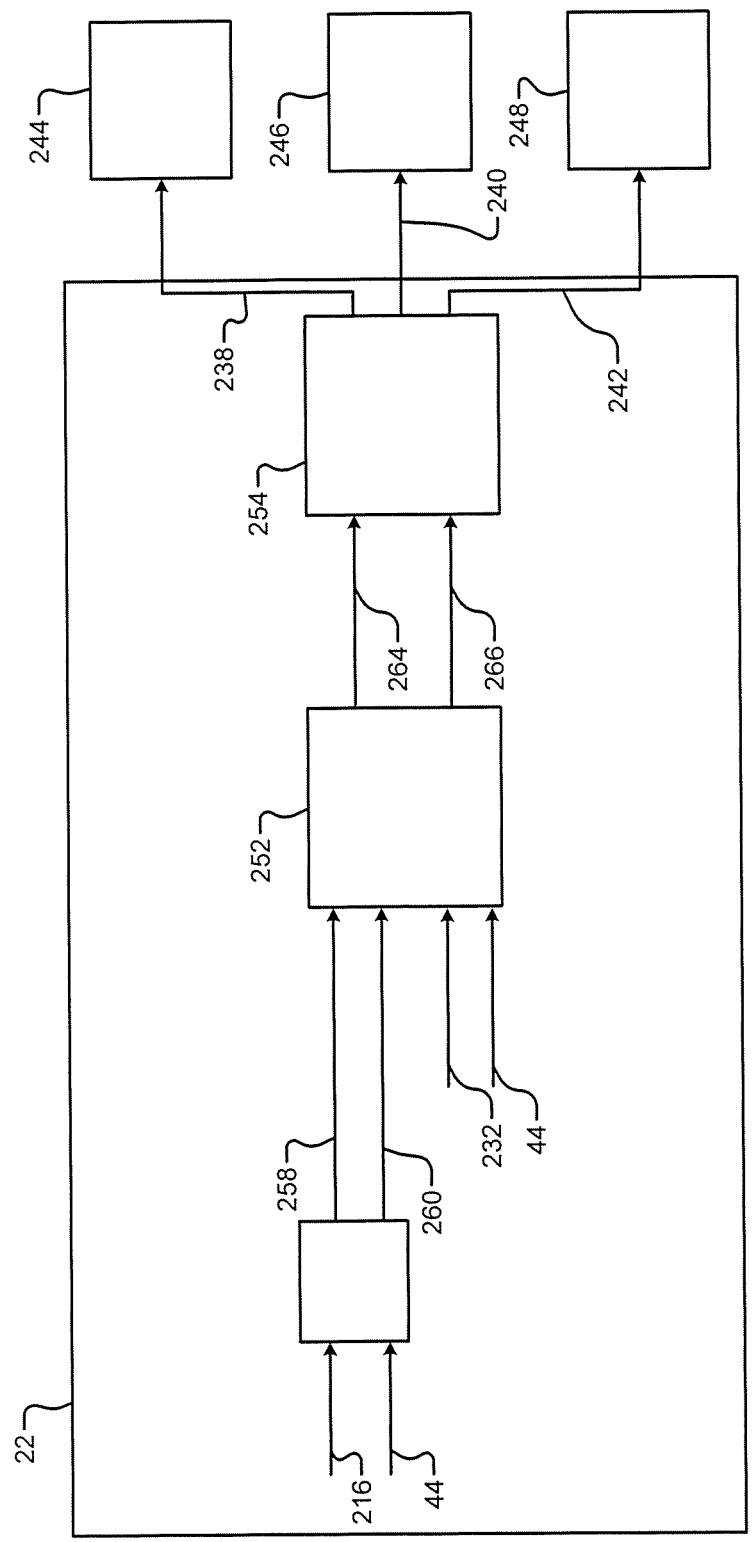
FIG. 3 is a functional block diagram of a blending module in accordance with the present disclosure.
Figure 4:
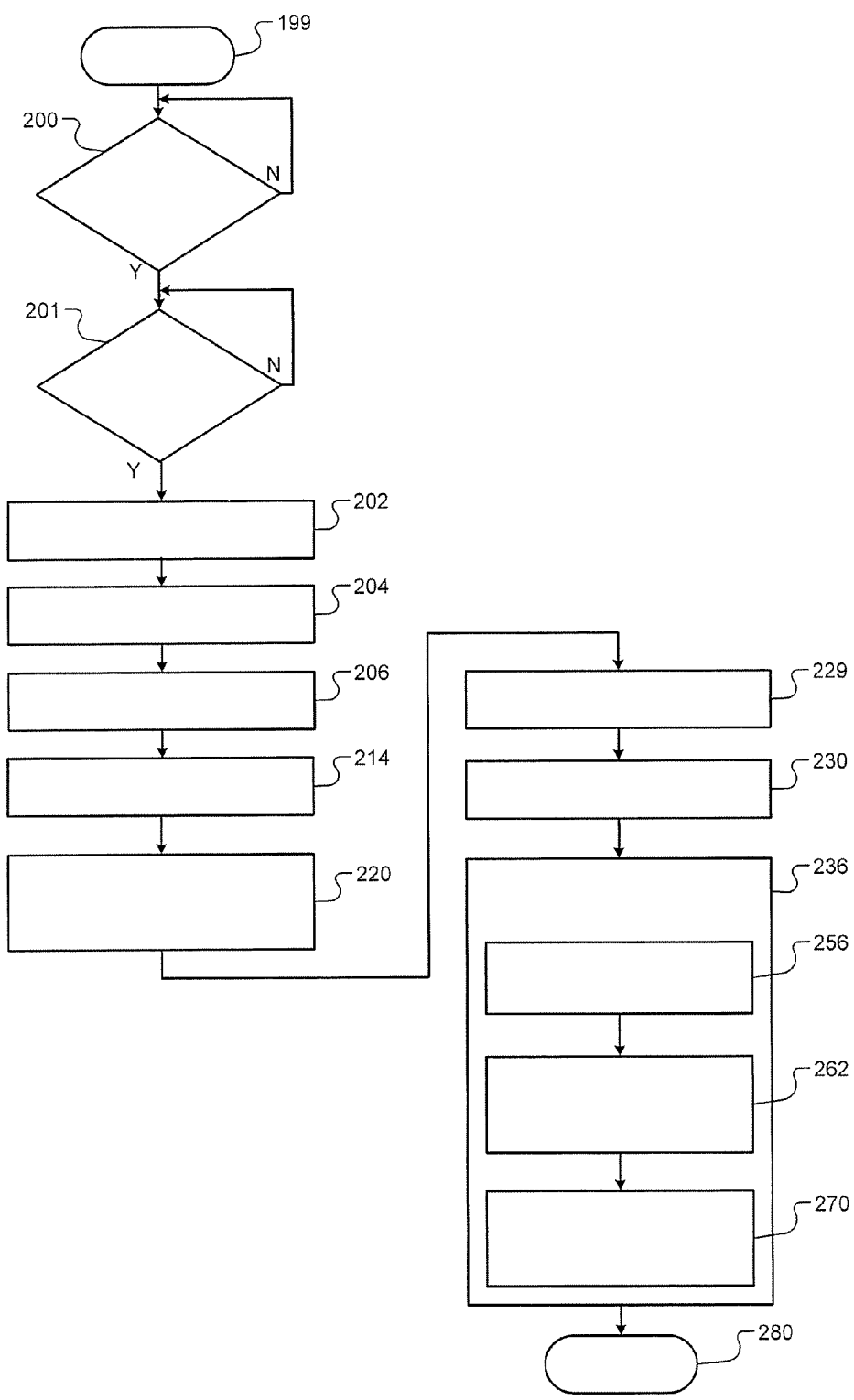
FIG. 4 illustrates a method of operating a stop-start engine control system in accordance with the present disclosure.

Referring now also to FIGS. 2-4, the ECM 18, the blending module 22, and a method of operating a stop-start engine control system are shown. The ECM 18 includes an engine speed module 150, an engine torque module 152, a load control module 153, and the blending module 22. A load control module 153 includes a static load module 154, a dynamic load module 156 and a load comparison module 158. Although the method is described primarily with respect to the embodiments of FIGS. 1-3 and 6, the method may be applied to other embodiments of the present disclosure. The tasks of the method may be iteratively performed. The method may begin at 199.

At 200, the ECM 18 determines whether speed of the vehicle is less than a predetermined vehicle speed and/or whether the speed of the vehicle is 0 meters/second (m/s) or miles-per-hour (MPH). The ECM 18 proceeds to task 202 when the vehicle speed is less than the predetermined vehicle speed. The ECM 18 proceeds to task 202 when the vehicle is started (e.g., key start or push-button start). At 201, the ECM 18 determines whether the engine is activated (running). The ECM 18 proceeds to task 202 when the engine is shut down. At 202, an accelerator signal, such as the accelerator signal ACCEL is generated. The accelerator signal ACCEL may include accelerator pedal position information and/or rate of change in accelerator pedal position.

The following tasks 204, 206, 214, 220 may be performed during an auto-start. At 204, the engine speed module 150 determines, calculates, looks-up and/or selects an engine speed profile RPM 205 based on the accelerator signal ACCEL 44. An engine speed profile may refer to a plot of engine speed versus time, which is based on information in the accelerator pedal signal ACCEL 44. At 206, the engine torque module 152 determines, calculates, looks-up and/or selects a torque output profile TORQ 207 of the ICE 14 based on the accelerator signal ACCEL 44 and/or an engine state variable. An engine state variable may be, for example, fuel injection quantity, fuel injection timing, engine speed, manifold pressure, spark timing, phaser position, and exhaust gas recirculation (EGR) quantity. A torque output profile may refer to a plot of engine torque versus time, which is based on information in the accelerator pedal signal ACCEL 44.

The engine speed and torque output profiles RPM 205, TORQ 207 may be generated based on models, equations, and/or tables (e.g., engine speed profiles 208 and engine torque profiles 210) and stored in memory 212. Each of the engine speed and torque output profiles RPM 205, TORQ 207 may be selected based on the accelerator signal ACCEL 44. The engine speed and torque output profiles RPM 205, TORQ 207 provide current and future (predicted) engine speed and torque output information. This information may include engine speeds and output torques during startup of the ICE 14 including engine speeds and output torques provided during a transition between the cranking speed and the idle speed (crank-to-idle transition). This allows the ECM 18 to predict upcoming engine speed and torque output values.

At 214, the static load module 154 determines, calculates, looks-up, and/or generates a static transmission load profile STATIC 216. One or more static transmission load profiles 218 may be stored in the memory 212 and selected by the static load module 154. The static transmission load profiles 218 may be based on static dynamometer testing. The static transmission load profiles 218 may be determined when the acceleration and/or rate of change in acceleration are less than corresponding predetermined acceleration and rate of change in acceleration values.

The static transmission load profiles 218 may be predetermined, for example, and based on dynamometer data collected when testing the transmission 106. For example, static load of the transmission 106 may be determined by cycling through operating speed ranges of the transmission 106 on a dynamometer and measuring the load of the transmission 106. The measured values may be stored in the memory 212 as predetermined values, as a static transmission load profile, and/or a mathematic model and/or equation.

At 220, the transmission load module 156 determines and/or estimates a dynamic transmission load profile DYN 222 based on the selected engine speed and torque output profiles 208, 210. The dynamic transmission load profile DYN 222 or hydrodynamic load may be generated based on empirical or predetermined data, and/or a mathematic model and/or equation. Dynamic transmission load profiles 223 may be stored in the memory 212. The dynamic transmission load profile DYN 222 indicates current and future estimates of load of the transmission 106 on the ICE 14.

Figure 5:
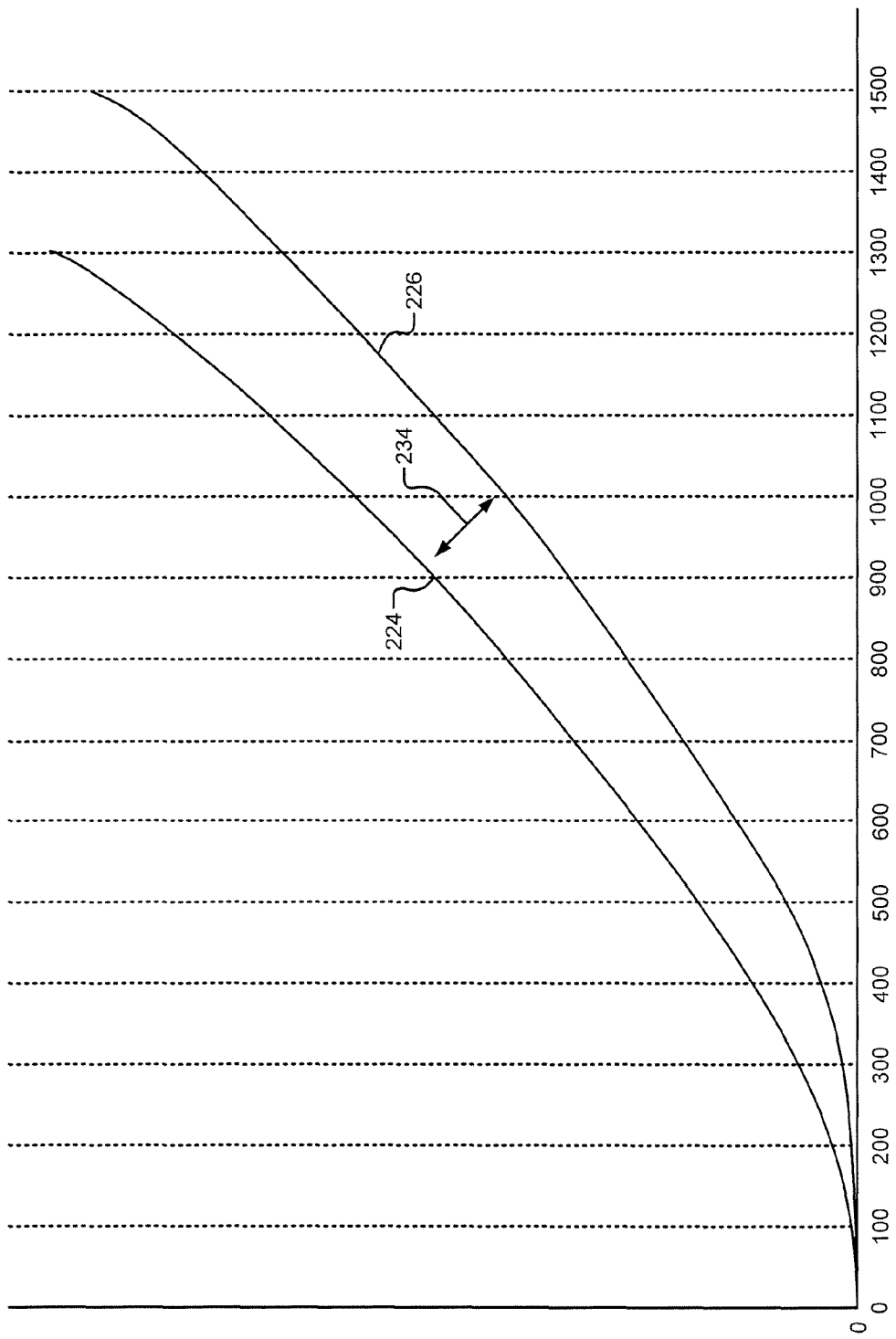
FIG. 5 is a plot illustrating exemplary static and dynamic transmission load profiles.
Figure 6:
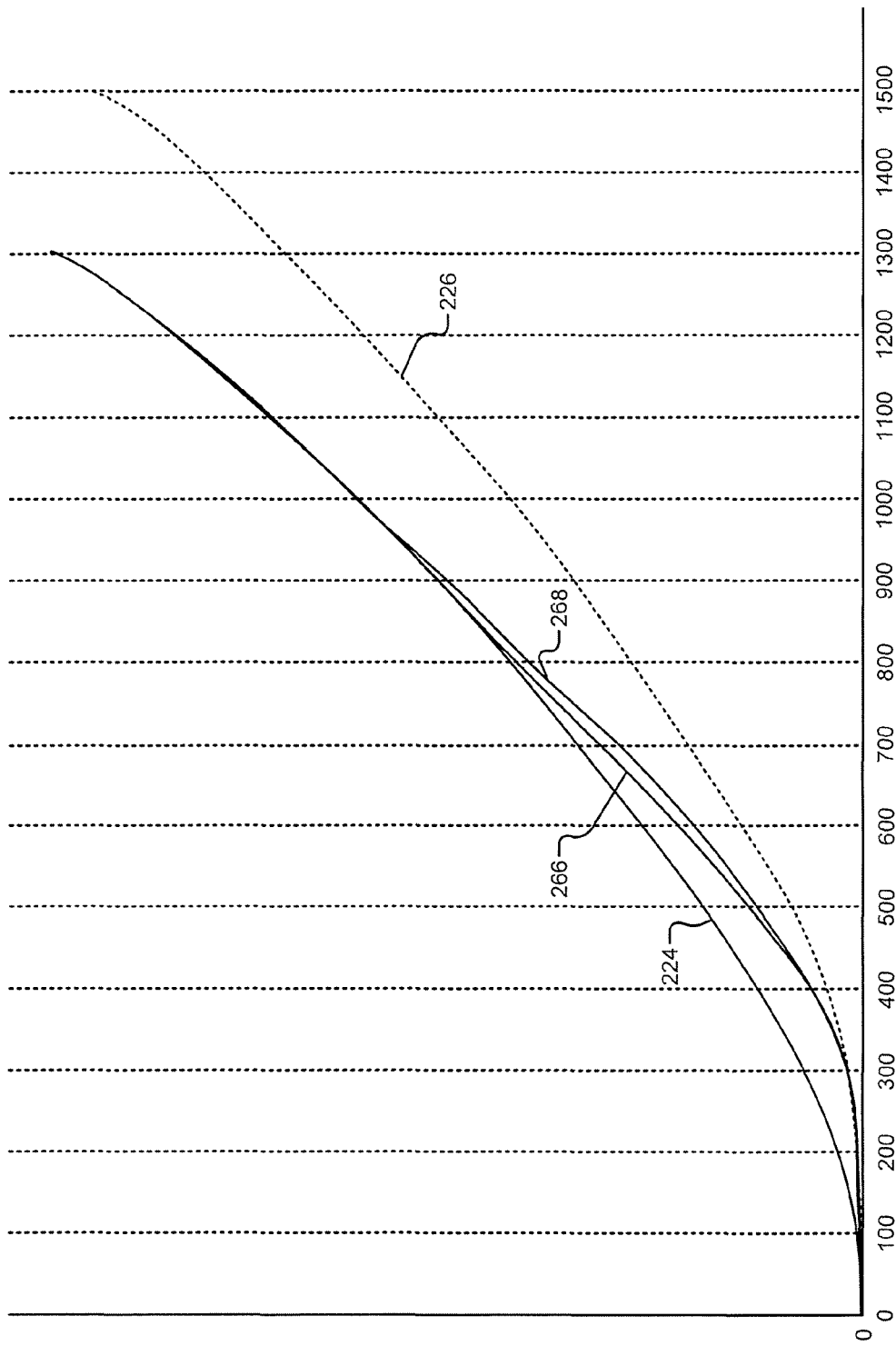
FIG. 6 is a plot illustrating exemplary static and dynamic transmission load profiles with blending according to the present disclosure.

The static and dynamic transmission load profiles determined and/or generated at 214 and 220 may provide transmission loads as a function of engine speed, as shown in FIGS. 5 and 6. The static and dynamic transmission load profiles may also include the transmission loads over time.

Referring now also to FIG. 5, a plot illustrating a static transmission load profile 224 and a dynamic transmission load profile 226 is shown. Transmission loads of a dynamic transmission load profile are generally less than transmission loads of a corresponding static transmission load profile relative to engine speed, as shown by profiles 224, 226. This difference is due to increased acceleration experienced when generating a dynamic transmission load profile, as opposed to when generating a static transmission load profile.

At 229, an auto-start mode may be initiated based on the accelerator signal ACCEL to startup the ICE 14. The auto-start mode may be initiated subsequent to task 220 and prior to task 230 or may be initiated subsequent to or prior to other tasks of the method.

At 230, the load comparison module 158 compares the static and dynamic load profiles STATIC 216, DYN 222 determined at 214 and 220. The load comparison module 158 may determine a difference between the static and dynamic load profiles 218, 223 and generate a difference signal DIFF 232. Arrow 234 of FIG. 5 identifies an example difference between static and dynamic load profiles. The difference signal 232 may be equal to a difference between static and dynamic loads of the profiles STATIC 216, DYN 222 relative to a certain engine speed and/or relative to a certain time.

At 236, the blending module 22 generates one or more of a spark control signal SPARK 238, a fuel control signal FUEL 240 and a throttle control signal THR 242 based on the accelerator signal ACCEL 44, the static transmission load signal STATIC 216, and the difference signal DIFF 232. The control signals SPARK 238, FUEL 240, THR 242 are received by respective spark, fuel and throttle control modules 244, 246, 248. The blending module 22 includes a base module 250, a compensation module 252, and an actuator control module 254.

At 256, the base module 250 generates base engine speed and/or torque signals $RPM_{BASE}$ 258, $TORQ_{BASE}$ 260. The signals $RPM_{BASE}$ 258 and $TORQ_{BASE}$ 260 may be generated based on the accelerator signal 44 and/or the static transmission load signal STATIC 216. The signals $RPM_{BASE}$ 258 and $TORQ_{BASE}$ 260 may be, for example, engine speed and torque values associated with increasing speed of the ICE 14 to an idle engine speed (e.g., 400-600 RPM) with a static transmission load. An idle engine speed may refer to, for example, a steady-state engine speed when the accelerator 40 is not actuated and the throttle 28 is in a predetermined position other than fully closed.

At 262, the compensation module 252 generates desired or compensated engine speed and/or torque signals $RPM_{COMP}$ 264, $TORQ_{COMP}$ 266 based on the accelerator signal 44, the difference signal 232, and the base engine speed and/or torque signals $RPM_{BASE}$ 258, $TORQ_{BASE}$ 260. The compensated engine speed signal $RPM_{COMP}$ 264 may be generated, for example, using equations 1 and/or 2, where $W_1$ is a first weight factor. The compensated torque signal $TORQ_{COMP}$ 266 may be generated, for example, using equations 3 and/or 4, where $W_2$ is a second weight factor. The weight factors W1 and W2 may be constants and/or set values that are predetermined based on which engine and/or transmission the method is applied.

$$RPM_{COMP}=F\{RPM_{BASE}, ACCEL, DIFF\} \quad (1)$$

$$RPM_{COMP}=RPM_{BASE}+W_1 \cdot ACCEL \cdot DIFF \quad (2)$$

$$TORQ_{COMP}=F\{TORQ_{BASE}, ACCEL, DIFF\} \quad (3)$$

$$TORQ_{COMP}=TORQ_{BASE}+W_2 \cdot ACCEL \cdot DIFF \quad (4)$$

The $W_1 \cdot ACCEL \cdot DIFF$ and $W_2 \cdot ACCEL \cdot DIFF$ components (compensation components) of equations 2 and 4 compensate for dynamic load experienced during the crank-to-idle transition. Rate at which transmission load blending between static and dynamic profiles is performed based on the accelerator signal component of equations 1-4. For example, the more the accelerator pedal 40 is "tipped in", the more engine output torque requested by the actuator control module 254 and/or the blending module 22. The change in engine output torque accounts for not only the position of the accelerator pedal 40, but also for the change in acceleration of the ICE 14 during startup. This causes the resulting transmission load on the ICE 14 to more quickly follow the static profile and at engine speeds less than the idle speed.

The difference signal component DIFF accounts for a change in transmission load experienced during the crank-to-idle transition. The compensation components may be adjusted over sequential combustion cycles and decreased as speed of the ICE 14 increases. The compensation components may be decreased to zero prior to speed of the ICE 14 being equal to the idle speed.

FIG. 6 is a plot illustrating the static transmission load profile 224, the dynamic transmission load profile 226, and example resulting dynamic transmission load profiles 266, 268 are shown. The resulting dynamic transmission load profile 266, 268 are generated based on blending of the profiles 224, 226. During a first phase, the resulting dynamic transmission load profiles 266, 268 follow the dynamic transmission load profile 226 at engine speeds less than a first predetermined speed (e.g., 200-300 RPM).

During a second phase, the resulting dynamic transmission load profiles 266, 268 are blended between profiles 224, 226 during the crank-to-idle mode and at engine speeds within a predetermined range (e.g., between 200-800 RPM). During a third phase, the resulting dynamic transmission load profiles 266, 268 may follow the static transmission load profile 224 at engine speeds greater than or equal to a second predetermined speed (e.g., 700 RPM). The first and second predetermined speeds may be minimum and maximum speeds of the predetermined range.

The first resulting dynamic transmission load profile 266 illustrates quicker blending than the second resulting dynamic transmission load profile 268. This may be provided based on the accelerator signal ACCEL.

At 270, the actuator control module 254 generates the control signals SPARK 238, FUEL 240 and THR 242 based on the compensated engine speed and/or torque signals $RPM_{COMP}$ 264, $TORQ_{COMP}$ 266. The control signals SPARK 238, FUEL 240 and THR 242 may be generated as a function of the compensated engine speed and/or torque signals $RPM_{COMP}$ 264, $TORQ_{COMP}$ 266. The control signals SPARK 238, FUEL 240 and THR 242 are generated to compensate for the change in transmission load experienced during the crank-to-idle transition. As an example, spark advance timing may be adjusted to increase or decrease torque output of the engine during the crank-to-idle transition. The control signals SPARK 238, FUEL 240 and THR 242 are generated to provide a resulting transmission load profile that in effect follows the dynamic transmission load profile DYN 222 and blends to the static transmission load profile STATIC 216. This blending begins during the predetermined engine speed range and before the engine speed increases to an idle speed.

The actuator control module 254 generates the spark, fuel and/or throttle control signals SPARK 238, FUEL 240 and THR 242 to ramp speed of the ICE 14 to the idle speed within a predetermined period of time (e.g., less than 400 milliseconds). The speed of the ICE 14 is ramped with minimal overshoot to provide a smooth automatic start (auto-start) that is "seamless" to a vehicle operator. An auto-start refers to activation and/or startup of an engine that is not based on, for example, a key start or push-button start, but rather is initiated by the ECM 18 based on torque requests. An auto-start occurs after a vehicle is started (e.g., key start) and during, for example, a key cycle. A key cycle refers to a period between a first time when a vehicle is started and a second time when a vehicle is shutdown. A smooth or seamless auto-start refers to a start with minimal or no abrupt changes in a rate of engine acceleration. To provide a smooth and seamless auto-start, the rate of change in engine acceleration may be maintained at a rate that is less than a predetermined rate during the crank-to-idle transition.

Fuel economy is improved with minimal overshoot. The term minimal overshoot refers to preventing speed of an engine from exceeding an idle speed by more than a predetermined amount. The predetermined amount may be, for example, 5-25 RPM. For example, an idle speed may be 600 RPM and the speed of the engine may be increased to 610 RPM and then reduced to the idle speed during the crank-to-idle transition.

The resulting engine speed profile over time is dependent on the load of the transmission. Since the load of the transmission is a function of a current engine speed, spark advance timing is accurately scheduled based on predicted transmission loads. The predicted transmission loads are provided by the transmission load profile determined at 220.

The method may end at 280. The above-described tasks are meant to be illustrative examples; the tasks may be performed sequentially, synchronously, simultaneously, continuously, during overlapping time periods or in a different order depending upon the application.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. An engine system of a vehicle comprising:
    an engine torque module that determines an engine output torque profile including predicted torque outputs based on an accelerator signal and an engine state variable;
    a load control module that determines a dynamic transmission load profile based on the engine output torque profile and an engine speed profile, wherein the dynamic transmission load profile includes transmission loads as a function of engine speed during an auto-start of an engine;
    a compensation module that generates a torque compensation signal based on the dynamic transmission load profile; and
    an actuator module that compensates for a change in a transmission load based on the torque compensation signal and during a transition of the engine from a crank state to an idle state.

2. The engine system of claim 1, wherein the predicted torque outputs of the engine include output torques during the transition of the engine from the crank state to the idle state.

3. The engine system of claim 1, further comprising an engine speed module that determines the engine speed profile including predicted engine speeds based on the accelerator signal,
    wherein the load control module determines the dynamic transmission load profile based on the engine speed profile.

4. The engine system of claim 3, further comprising a comparison module that compares the dynamic transmission load profile to a static transmission load profile to generate a difference signal, wherein:
    the compensation module generates an engine speed compensation signal based on a base engine speed signal, the difference signal and the accelerator signal; and
    the actuator module compensates for the change in the transmission load based on the engine speed compensation signal and during the transition of the engine from the crank state to the idle state.

5. The engine system of claim 1, wherein the compensation module generates the torque compensation signal during a stop-start of the engine and after a last startup of the vehicle.

6. The engine system of claim 1, wherein the load control module comprises:
    a static load module that generates a static transmission load profile;
    a dynamic load module that generates the dynamic transmission load profile; and
    a load comparison module that compares the static transmission load profile and the dynamic transmission load profile to generate a difference signal.

7. The engine system of claim 6, wherein the compensation module generates the torque compensation signal based on the difference signal.

8. The engine system of claim 7, wherein the compensation module generates the torque compensation signal based on the accelerator signal and the static transmission load profile.

9. The engine system of claim 6, wherein the compensation module generates the torque compensation signal based on a base torque signal, the difference signal, and the accelerator signal.

10. The engine system of claim 1, wherein the actuator module generates a spark control signal and adjusts spark advance of the engine based on the torque compensation signal.

11. The engine system of claim 1, wherein the actuator module blends a resulting dynamic transmission load on the engine between the dynamic transmission load profile and a static transmission load profile prior to speed of the engine increasing to an idle speed.

12. The engine system of claim 11, wherein the compensation module adjusts rate at which the resulting dynamic transmission load transitions from following the dynamic transmission load profile to following the static transmission load profile.

13. The engine system of claim 1, wherein the actuator module compensates for the change in transmission load during the transition of the engine from the crank state to the idle state by generating a spark control signal, a fuel control signal and a throttle control signal based on the torque compensation signal.

14. The engine system of claim 1, wherein:
    the engine state variable identifies a speed of the engine;
    spark and fuel to the engine are enabled when the engine is started; and
    prior to starting the engine
        the engine torque module selects the engine output torque profile from a plurality of engine output torque profiles based on the accelerator signal and the engine state variable, and
        the load control module selects the dynamic transmission load profile from a plurality of dynamic transmission load profiles based on the engine output torque profile and the engine speed profile.

15. The engine system of claim 14, further comprising
    a static load module that selects a static transmission load profile, wherein the static transmission load profile includes a first plurality of transmission loads relative to a plurality of engine speeds, and wherein the dynamic transmission load profile includes a second plurality of transmission loads relative to the plurality of engine speeds;
    a comparison module configured to compare the static transmission load profile to the dynamic transmission load profile to generate a difference signal; and
    a blending module that, via the actuator module and subsequent to the engine being started, blends a resulting transmission load from the dynamic transmission load profile to the static transmission load profile based on the difference signal.

16. A method of operating an engine system comprising:
    determining an engine output torque profile including predicted torque outputs based on an accelerator signal and an engine state variable;
    determining a dynamic transmission load profile based on the engine output torque profile and an engine speed profile, wherein the dynamic transmission load profile includes transmission loads as a function of engine speed during a startup of an engine;

generating a torque compensation signal based on the dynamic transmission load profile; and compensating for a change in a transmission load based on the torque compensation signal and during a transition of the engine from a crank state to an idle state.

17. The method of claim 16, further comprising:

determining the engine speed profile including predicted engine speeds based on the accelerator signal;

comparing the dynamic transmission load profile to a static transmission load profile to generate a difference signal;

generating an engine speed compensation signal based on a base engine speed signal, the difference signal and the accelerator signal; and compensating for the change in the transmission load during the transition of the engine from the crank state to the idle state based on the engine speed compensation signal, wherein the dynamic transmission load profile is determined based on the engine speed profile.

18. The method of claim 16, wherein the torque compensation signal is generated during a stop-start of the engine and after a last startup of a vehicle.

19. The method of claim 16, further comprising:

generating a static transmission load profile; and comparing the static transmission load profile and the dynamic transmission load profile to generate a difference signal, wherein the torque compensation signal is generated based on the difference signal.

20. The method of claim 16, further comprising:

blending a resulting dynamic transmission load on the engine between the dynamic transmission load profile and a static transmission load profile prior to speed of the engine increasing to an idle speed; and adjusting a rate at which the resulting dynamic transmission load transitions from following the dynamic transmission load profile to following the static transmission load profile.

* * * * *